April 5, 1927.
G. VAN DAAM
AUTOMOBILE WHEEL
Filed March 24, 1926
1,623,645
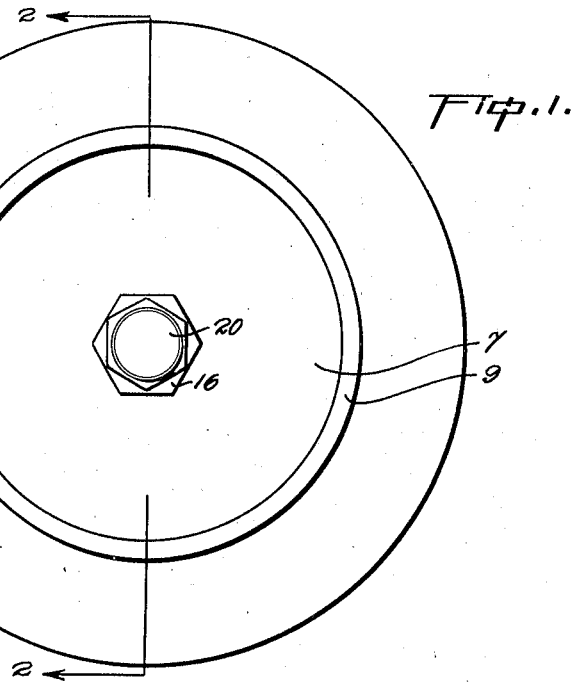
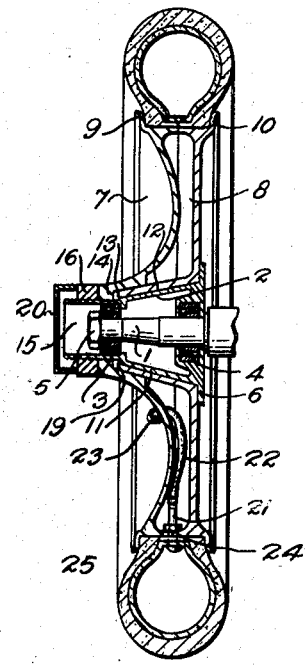
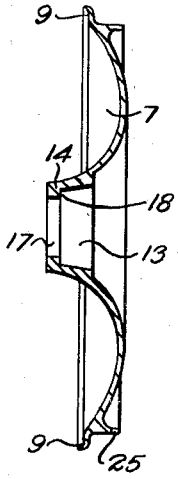
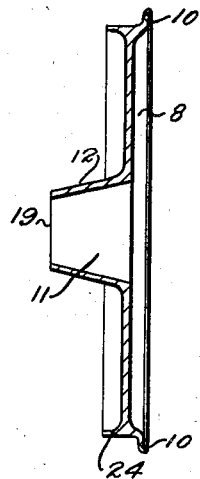
INVENTOR
GERRIT VAN DAAM.
By Fetherstonhaugh
Attys Patented Apr. 5, 1927.

1,623,645

UNITED STATES PATENT OFFICE.

GERRIT VAN DAAM, OF BUFFALO, NEW YORK.

AUTOMOBILE WHEEL.

Application filed March 24, 1926. Serial No. 97,054.

My invention relates to improvements in vehicle wheels which are adapted to receive pneumatic tires, and the object of the invention is to construct a wheel and rim of two members which will come apart when the wheel is removed from the car and so permit the ready removal of the tire without the necessity of using any tire removing tools and a further object of the invention is to utilize a unitary nut for securing the two portions of the wheel together as well as providing a means for securing the wheel upon the hub.

My invention consists of a wheel constructed and arranged all as hereinafter more particularly described and illustrated in the accompanying drawing in which:

Fig. 1 is a side elevational view of my wheel showing the pneumatic tire mounted thereon.

Fig. 2 is a vertical sectional view through the line 2—2 Figure 1 showing the wheel mounted on a fragmentary portion of an automobile axle.

Fig. 3 is a sectional view through one member of my wheel, and,

Fig. 4 is a section view through the other member of my wheel.

Like characters of reference indicate corresponding parts in the different views.

1 is the spindle of the usual type provided upon automobile axles and adapted to receive the tapered hub 2 which is rotatably mounted upon the sets of roller-bearings 3 and 4 in the usual fashion, the hub being retained upon the spindle by the nut 5. A circular flange 6 is provided upon the inner face of the hub 2 and against which the wheel is retained as will be hereinafter described.

The detachable wheel primarily consists of two substantially disk shaped members 7 and 8 of the same diameter, the peripheries of these two members constituting the tire receiving rim, the usual outer and inner flanges 9 and 10 being formed thereon.

Upon the center of the member 8 I provide an outwardly extending sleeve 11 of truncated, conical form, such sleeve being adapted to be mounted upon the tapered hub 2, the inner face of the member 8 abutting the outer face of the flange 6. The other member 7 of the wheel is adapted to be positioned upon the outer face 12 of the sleeve 11 being provided with a centrally disposed tapered orifice 13 in the boss 14 and into which the outer end of the sleeve 11 is inserted. Upon reference to Figure 2 it will be seen that the outer end of the tapered hub 2 is provided with a cylindrical extension sleeve 15, the outer end of which is threaded and adapted to receive the nut 16. The outer end of the boss 14 is provided with a circular orifice 17 adapted to receive the extension sleeve 15 when the member 7 is positioned upon the sleeve 11.

As the orifice 17 is of a smaller diameter than the inside or smallest diameter of the tapered orifice 13 a shoulder 18 is formed interiorly of the hub 14. I prefer to make the smallest diameter of the tapered orifice 13 slightly smaller than the smallest diameter of the sleeve 11 so that the outer end 19 of such sleeve does not bear against the shoulder 18 formed in the orifice 13 in the boss 14 when the wheel is being assembled. 20 is the hub cap which is adapted to be threaded upon the outer end of the extension sleeve 15 on the hub 2, abutting against the nut 16 and thus constituting a lock therefor.

To obviate the necessity of providing an intricate construction for giving access to the nozzle of the tire valve member 21 I provide a flexible tube 22 one end of which is adapted to be secured to the valve member 21, the valve proper being removed therefrom. The other end of the tube 22 communicates with a valve member 23 in the wheel member 7, such member 23 being provided with the usual tire valve mechanism and adapted to receive the nozzle of an air line for inflating purposes.

The operation of mounting my wheel is as follows:

The hub 2 is of course permanently secured upon the axle as before described being retained by the nut 5. The member 8 is first mounted upon the hub 2, the sleeve 12 being seated upon such hub and the inner face of the member abutting the outer face of the flange 6. The tire with the tube therein is next positioned upon the rim portion of the member 8, the valve member 21 being positioned in a recess 24 provided in the rim for such purpose. The member 7 is now positioned in place, the sleeve 12 entering the orifice 13 and the extension sleeve 15 on the hub 2 entering the orifice 17. When the member 7 is in position its rim portion will of course abut against the rim portion of the member 8 and so constitute a complete tire receiving rim, such rim portion of the member 7 also being provided with a recess 25 to receive the valve member 21. It will of course be appreciated that the tube 22 extending from the valve member 21 must be attached to the inner end of the valve 23 before the member 7 is positioned in place. The nut 16 is now threaded upon the extension sleeve 15 and upon being tightened up will press the sleeve 14 tightly upon the sleeve 12 and will also tighten the sleeve 12 upon the tapered hub 2 making it bear tightly against the flange 6. This tightening pressure by the nut 16 will of course effect a complete abutment of the rim portions upon the members and so prevent any springing apart when the tire is inflated. The hub cap 20 is now threaded upon the outer end of the extension sleeve 15 coming against the outer face of the nut 16 and constituting a lock therefor.

When it is desired to gain access to the inner tube it is merely necessary to unthread the hub cap 20 and nut 16 and give the wheel a sharp tap outwardly on the sleeve 12, and sleeve 14 will slide from the sleeve 12, and the sleeve 12 slide from the hub 2 thus permitting the wheel assembly to come apart and the tire and tube drop therefrom.

From the foregoing description it will be apparent that I have devised an extremely simple form of disk wheel in which the arduous work of removing the tire therefrom is entirely obviated thus dispensing with tire-irons or any other form of leverage tools. Furthermore by enabling the inner tube to be positioned within the tire before it is placed upon the rim I have devised a means whereby any possibility of nipping the inner tube or getting it twisted is eliminated. It will of course be appreciated that the drawings show my wheel secured upon the front axle of an automobile but it will be understood that it could with equal facility be positioned upon the rear axle, the hub 2 being secured to such axle instead of freely rotating therearound.

What I claim as my invention is:

1. In a vehicle wheel the combination of a hub on the axle spindle and a disk-like body member adapted to be secured upon the hub, a sleeve on the disk-like body member adapted to fit over the hub, a threaded portion upon the outer face of the hub, of a second disk-like member adapted to be positioned upon the sleeve and abut the first disk-like member, means whereby a complete tire supporting rim is formed by the peripheries of the disk-like members, and a nut adapted to be threaded upon the threaded portion upon the outer face of the hub for securing the two disk-like members in abutment thereon.

2. In a vehicle wheel the combination of a tapered hub on the axle spindle and a disk-like body member adapted to be secured upon the hub, a tapered sleeve on the disk-like body member adapted to fit over the hub, a threaded portion upon the outer face of the hub, of a second disk-like member adapted to be positioned upon the sleeve and abut the first disk-like member, means whereby a complete tire supporting rim is formed by the peripheries of the disk-like members, and a nut adapted to be threaded upon the threaded portion upon the outer face of the hub for securing the two disk-like members in abutment thereon.

3. In a vehicle wheel the combination of a hub on the axle spindle and a disk-like body member adapted to be secured upon the hub, a sleeve on the disk-like body member adapted to fit over the hub, a second disk-like body member adapted to be positioned upon the sleeve of and abut the first disk-like body member, means whereby the peripheries of the disk-like members are each formed to constitute part of the tire supporting rim, means whereby a complete tire supporting rim is formed by the two disk-like members, a sleeve on the second disk-like body member adapted to fit over the sleeve on the first disk-like body member, a threaded portion on the outside end of the hub, and a nut adapted to be threaded upon such portion and engage the outer end of the sleeve on the second disk-like body member for securing both disk-like body members in their adjusted positions.

4. In a vehicle wheel, the combination of a tapered hub on the axle spindle and a disc-like body member adapted to be secured upon the hub, a tapered sleeve on the disc-like body member adapted to fit over the tapered hub, of a second disc-like body member adapted to be positioned upon the sleeve and abutting the first disc-like body member, a tapered sleeve on the second disc-like body member adapted to fit over the sleeve of the first disc-like body member, its outer end projecting beyond the outer face thereof, a threaded portion on the outside end of the hub, and a nut adapted to be threaded upon such portion and engage the projecting portion of the sleeve on the second disc-like body member for securing such sleeve tightly upon the taper of the first-mentioned sleeve and securing both disc-like body members in their adjusted positions.

GERRIT VAN DAAM.